Patented Aug. 22, 1950

2,520,052

UNITED STATES PATENT OFFICE 2,520,052

3,4-BIS-(M-METHYL-p-HYDROXYPHENYL)-HEXANE

Victor Niederl, Round Top, N. Y., and Albert Bloom, Summit, N. J., assignors to Reed & Carnrick, Jersey City, N. J., a corporation of New Jersey No Drawing. Application September 10, 1946, Serial No. 696,050

1 Claim. (Cl. 260—619)

The present invention relates to dialkyldihydroxydiphenyl hexadiene, its hydrogenation products, their ethers, and their esterification products.

This application is a continuation-in-part of application Serial No. 524,090, filed February 26, 1944, and which has issued as Patent No. 2,419,516.

It is an object of this invention to provide a number of novel estrogenic compounds of high estrogenic activity and very low toxicity.

It is a special object of the invention to provide novel estrogenic compounds, which, due to their high estrogenic activity and very low toxicity, possess very favorable therapeutic indices.

Other objects of this invention will be clear from the more detailed disclosures which follow.

The preparation of the dialkyldiacidyloxydiphenyl hexadienes, such as dialkyldiacetoxydiphenyl hexadiene, from which the other compounds of this invention may be prepared, can be considered to take place in four steps, although certain of these steps may be advantageously combined under favorable circumstances. In the first step of the process a suitable alkyl phenol, such as one of the various methyl, ethyl, propyl, and butyl phenols, is reacted with a propionic acid halide or anhydride to produce an alkylphenyl propionate. In the second step, this propionate is subjected to molecular rearrangement to produce an alkylhydroxyphenyl propiophenone. In the third step, two mols of this ketone is condensed to produce a 3,4-bis-(alkylhydroxyphenyl) - 3,4 - dihydroxy-hexane. In the fourth step this compound is treated with an organic acid chloride and an appropriate organic acid anhydride to yield a 3,4-bis-(alkylacidyloxyphenyl)-2,4-hexadiene. Hydrolysis with dilute alkali produces a 3,4-bis-(alkylhydroxyphenyl)-2,4-hexadiene. This 3,4-bis-(alkylhydroxyphenyl-2,4-hexadiene may be converted into any one of various diesters by treatment with appropriate excesses of organic acid halides or acid anhydrides.

By using other molar proportions of the organic acid halides or anhydrides and employing suitable separation procedures, the monoesters of the 3,4 - bis - (alkylhydroxyphenyl) - 2,4 - hexadienes may be obtained. These monoesters may also be procured from the diesters by half-saponification methods which involve saponifying the diesters under comparatively mild conditions, such as in the presence of low concentrations of alcoholic alkali for a limited time, and separating the mixture of reaction products. The separation may be achieved by taking advantage of differences in the solubilities of the diesters, the monoesters, and the dihydroxy compound, such, for example, as in dilute alkalies.

The aforementioned dihydroxy compounds may be converted into ethers by any of the conventional methods for preparing phenol ethers which involve exposing the phenolic compounds, or their sodium or potassium salts, to the action of various alkylating agents, such as alkyl halides and alkyl sulfates under conditions conducive to alkylation. For example, ethers of the mentioned dihydroxy hexadiene compounds result when the sodium salts of these compounds are allowed to react with methyl or other alkyl iodides. Both mono- and dialkyl ethers may be produced, and the reaction can be controlled by adjusting the relative quantities of phenolic compound and alkylating agent employed.

By appropriate catalytic hydrogenation of the 3,4-bis-(alkylacidyloxyphenyl)-2,4-hexadiene, the respective hexenes and hexanes are prepared, from which the dihydroxy compounds and the respective esters and ethers may be obtained by the same method as already described. By hydrogenating under conditions so controlled that only two atoms of hydrogen is added to the aliphatic diene chain, the hexene compound is obtained, and by complete hydrogenatoin four atoms of hydrogen is introduced into the diene chain, and thus the hexanes are obtained. Hexanes may be obtained, for instance, by subjecting the hexadienes to hydrogenation at elevated temperatures and elevated pressures in the presence of a suitable catalyst, such as Raney nickel, as illustrated in certain of the examples. Platinum or palladium black catalyst may be used when it is desirable to carry out the hydrogenation at room temperature and at a pressure of 2 to 3 atmospheres. The hexadiene compounds may also be subjected to controlled hydrogenation procedures employed to partially saturate compounds having a conjugate double bond system, such as interrupting hydrogenation when 1-4 addition of hydrogen is achieved. The hexene or stilbene derivatives may also be prepared by starting with a 3,4-bis-(alkylhydroxyphenyl-3,4-dihydroxy-hexane and treating it either with halogen hydracids to produce the corresponding 3,4-dihalohexane compounds, and then reacting the latter compounds with zinc dust or other dehalogenating agents to produce the hexene type of compound. Additionally, the 3,4-bis-(alkylhydroxyphenyl) - 3,4 - dihydroxy-hexane may be treated with hydrochloric acid under appropriate conditions to form the 3,4-epoxyhexane derivative, which is reduced to the 3-hexanol derivative and then dehydrated to the stilbene compound.

The foregoing dialkyldihydroxydiphenyl hexadienes, dialkyldihydroxydiphenyl hexenes, dialkyldihydroxydiphenyl hexanes, their various esters, and their various ethers are referred to collectively herein as dialkyldihydroxydiphenyl hexadiene, its hydrogenation products, their ethers, and their esterification products.

Collectively, the preferred compounds of this invention may be referred to by the following formulas:

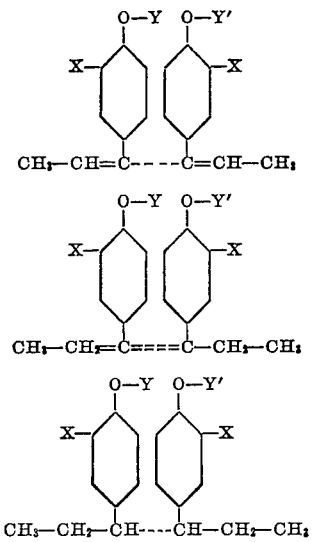

wherein X is an alkyl radical, and Y and Y' are hydrogen, hydrocarbon radicals, or acyl radicals. In the foregoing formulas Y and Y' may be the same or different, and X is advantageously a methyl radical where estrogenic potency of the highest order is desired. Compounds containing ester radicals derived from saturated aliphatic acids of two to four carbon atoms and those obtained from succinic acid, benzoic acid, m-sulfobenzoic acid, and alkyl carbonic acids are of special importance as synthetic estrogens. It is clear from the formulas that the X and Y radicals may have their positions designated as 3' and 4', respectively, or m and p, respectively.

The following examples disclose the production of a dimethyldihydroxydiphenyl hexadiene, a dimethyldiacetoxydiphenyl hexadiene, a dimethyldipropionoxydiphenyl hexadiene, a dimethyldibutyroxydiphenyl hexadiene, a dimethyldibenzoxydiphenyl hexadiene, a dimethyldihydroxydiphenyl hexane, a dimethyldiacetoxydiphenyl hexane, a dimethyldipropionoxydiphenyl hexane, a dimethyldibutyroxydiphenyl hexane, and a dimethyldibenzoxydiphenyl hexane as prepared from alkylated phenols such as o-cresol. Other alkylated phenols, including ethyl phenols, propyl phenols, butyl phenols, and the like, may be used in a similar manner. Likewise, other carboxylic acid esters, including those derived from higher fatty acids, succinic acid, m-sulfobenzoic acid, and alkyl carbonic acids, may be formed either through esterification of the dihydroxy compounds or through a utilization of other acids as shown in the fourth of the general description of the process.

*Example I*

A. Molar quantities of o-cresol and propionyl chloride are allowed to react in a suitable container, producing, with the elimination of hydrochloric acid, the o-methylphenyl propionate in a quantitative yield. The crude material may be used for the next step without further purification.

B. Thirty grams of o-methylphenyl propionate is dissolved in 100 milliliters of dry nitrobenzene and chilled in an ice bath; 35 grams of aluminum chloride is added in small portions, and the reaction mixture is kept cold during the addition of aluminum chloride, after which it is left standing in an ice bath for several hours and then at room temperature overnight. Thereafter, the reaction mixture is decomposed with ice water, a few milliliters of hydrochloric acid are added, and the reaction mixture is extracted with ether. The ether solution is washed with water and then extracted with 10 per cent sodium hydroxide solution. Finally crushed ice is added to this solution which is then acidified with hydrochloric acid. The precipitate formed is collected and subjected to steam distillation to remove the ortho isomer. This m-methyl-p-hydroxyphenyl-propiophenone may be used for the next reaction without further purification.

C. Twenty grams of the above ketone is added to 40 grams of amalgamated aluminum foil covered with 1 liter of moist ether and refluxed for several hours. After standing overnight, the reaction mixture is filtered, and the residual magma is washed well with ether. The ether solutions are combined and concentrated by removing most of the ether, after which the residue is placed in the refrigerator for several days to allow it to solidify. The crystalline product is then collected and washed with a small portion of cold acetic acid. After recrystallization from ethanol the 3,4-bis-(m-methyl-p-hydroxyphenyl)-3,4-dihydroxy-hexane melts at 182 to 183° C.

D. Five grams of the above glycol is suspended in 15 milliliters of acetic acid anhydride, and 10 milliliters of acetyl chloride is added. The flask is placed in a water bath which is gradually heated to 70° C., and heating at this temperature is continued for about twenty minutes. The flask is chilled, and the reaction mixture is decomposed with finely crushed ice. The precipitate obtained is recrystallized from ethanol and then the 3,4-bis-(m-methyl-p-acetoxyphenyl)-2,4-hexadiene has a melting point of 166 to 168° C.

*Example II*

One gram of 3,4-bis-(m-methyl-p-acetoxyphenyl)-2,4-hexadiene is placed in a 50-milliliter evaporating dish, and 10 milliliters of Claisen solution (50 per cent potassium hydroxide diluted with an equal volume of methanol) is added. This solution is warmed on a water bath at a temperature not exceeding 50° C. until the solid material has dissolved, and then it is left standing at room temperature for twenty-four hours. This solution is diluted with 40 milliliters of distilled water, filtered, and gradually acidified with 10 per cent hydrochloric acid to Congo red. The precipitate solidifies after standing in the refrigerator for several hours. Thereafter, it is filtered off, washed with distilled water, and placed on porous tile to dry. After recrystallization from 50 per cent ethanol, the 3,4-bis-(m-methyl-p-hydroxyphenyl)-2,4-hexadiene melts at 187 to 189° C.

*Example III*

One gram of 3,4-bis-(m-methyl-p-hydroxyphenyl)-2,4-hexadiene is dissolved in 20 milliliters of propionic acid anhydride and gently refluxed for thirty minutes. The solution is allowed to cool and then is poured into an Erlenmeyer flask containing finely cracked ice. The flask is shaken until a precipitate is formed, after which more ice is added, and the reaction mixture is left standing for twenty-four hours to permit complete hydrolysis of the excess propionic anhydride and to allow the precipitate to solidify. The 3,4-bis-(m-methyl-p-propionoxyphenyl)-2,4-hexadiene when recrystallized from ethyl acetate melts at 138 to 140° C.

Other esters may be produced in a similar manner.

*Example IV*

One gram of 3,4-bis-(m-methyl-p-hydroxyphenyl)-2,4-hexadiene is dissolved in 10 milliliters of anhydrous pyridine; 2.5 milliliters of butyric anhydride is added, and the mixture is refluxed gently for two and a half hours. After cooling, the reaction mixture is treated with water, and the solid which separates after a while is collected. The 3,4-bis-(m-methyl-p-butyroxyphenyl)-2,4-hexadiene thus obtained is recrystallized from methanol; the melting point is 123 to 124° C.

*Example V*

One-tenth gram of 3,4-bis-(m-methyl-p-hydroxyphenyl)-2,4-hexadiene is dissolved in a quantity of dilute sodium hydroxide solution slightly in excess of the amount demanded by theory. While shaking the clear solution thus obtained, 1 milliliter of benzoyl chloride is added, drop by drop; after the addition of the benzoyl chloride, an excess of ammonium hydroxide solution is introduced, and the agitation is continued for another ten minutes. The mixture is then allowed to stand to allow complete precipitation. The white solid is filtered off, washed thoroughly with water, and dried. Recrystallization from ethanol yields white needles of 3,4-bis-(m-methyl-p-benzoxyphenyl)-2,4-hexadiene melting at 207 to 208° C.

*Example VI*

Two grams of 3,4-bis-(m-methyl-p-acetoxyphenyl)-2,4-hexadiene is dissolved in 200 milliliters of hot ethanol and subjected to hydrogenation at 70° C. and 1,000 pounds pressure for two hours in the presence of a suitable catalyst, such as Raney nickel. This solution is filtered to remove the catalyst and concentrated to a volume of 50 milliliters. The concentrate is placed in a refrigerator overnight, and then the material crystalizing out is filtered off and dried on porous tile. This material, 3,4-bis-(m-methyl-p-acetoxyphenyl)-hexane, melts at 132° C.

*Example VII*

One gram of 3,4-bis-(m-methyl-p-acetoxyphenyl)-hexane is dissolved in 10 milliliters of Claisen solution and heated on the water bath until it has completely dissolved. After standing at room temperature for twenty-four hours, this solution is diluted with 40 milliliters of distilled water, filtered, and then gradually acidified with 10 per cent hydrochloric acid to Congo red. The precipitate is allowed to solidify, filtered off, and placed on porous tile to dry. The 3,4-bis-(m-methyl-p-hydroxyphenyl)-hexane is recrystallized from 50 per cent ethanol and melts at 145° C.

*Example VIII*

One gram of the 3,4-bis-(m-methyl-p-hydroxyphenyl)-hexane is dissolved in 20 milliliters of propionic acid anhydride and gently refluxed for thirty minutes. The solution is allowed to cool and is poured into a vessel containing finely crushed ice. The vessel is shaken until a precipitate is obtained; the solution is left standing for twenty-four hours to permit complete solidification of the precipitate which then is filtered off and placed on porous tile to dry. The 3,4-bis-(m-methyl-p-propionoxyphenyl)-hexane is recrystallized from ethanol and then melts at 115° C.

*Example IX*

One gram of 3,4-bis-(m-methyl-p-hydroxyphenyl)-hexane is dissolved in 10 milliliters of anhydrous pyridine; 2.5 milliliters of butyric anhydride is added, and the mixture is refluxed gently for two and a half hours. After cooling, the reaction mixture is treated with water, and the solid which precipitates is collected. On recrystallizing from methanol, the 3,4-bis-m-methyl-p-butyroxyphenyl)-hexane melts at 101° C.

*Example X*

One-tenth gram of 3,4-bis-(m-methyl-p-hydroxyphenyl)-hexane is dissolved in a quantity of dilute sodium hydroxide solution slightly in excess of the amount demanded by theory. To the clear solution thus obtained, 1 milliliter of benzoyl chloride is added, drop by drop, under continuous agitation. Then an excess of ammonium hydroxide solution is added, and the shaking is continued for ten more minutes. The mixture is allowed to stand for a few minutes, after which the precipitate formed is filtered, washed thoroughly with water, and dried. Recrystallization from methanol yields white needles of 3,4-bis-(m-methyl-p-benzoxyphenyl)-hexane melting at 199 to 200° C.

We have found that the estrogenic compounds of the preceding examples can be administered, without observable toxic effects, in doses which exceed many times the effective estrogenic doses. Moreover, we have found that certain of the derivatives of the initially prepared 3,4-bis-(m-methyl-p-acetoxyphenyl)-2,4-hexadiene are most advantageously administered parenterally, while others are most advantageously administered orally. For example, 3,4-bis-(m-methyl-p-hydroxyphenyl)-2,4-hexane when administered parenterally in 1.0 gamma doses will still produce 95 per cent estrus on ovariectomized rats. On the other hand, 5 gammas of 3,4-bis-(m-methyl-p-propionoxyphenyl)-hexane will produce 80 per cent estrus when orally administered. The estrogenic potency of the compounds of this invention may be readily appreciated when it is recognized that an oral administration of 50 gammas of estrone produces only 70 per cent estrus in rats treated according to standard procedure. The estrogenic potency of the compounds of this invention is further demonstrated by the results of clinical experiments which disclose that the ordinary symptoms in the average menopausal patient are completely dissipated through the oral administration of from but 2 to 4 milligrams of 3,4-bis-(m-methyl-p-propionoxyphenyl)-hexane per day.

It will be understood that the discussion of the estrogenic potency and the unusual freedom from toxicity of certain of the compounds of this invention is merely illustrative of the properties generally possessed by the other compounds specifically disclosed herein.

It will be understood further that the embodiments of our invention described in the specification and in the examples are only illustrative of the compounds and the processes by which they are produced. Various modifications can be made without departing from the principles of the invention or the scope of the invention which is defined in the claim.

We claim:

A new article of manufacture, 3,4-bis-(m-methyl-p-hydroxyphenyl)-hexane.

VICTOR NIEDERL.
ALBERT BLOOM.

REFERENCES CITED

The following references are of record in the file of this patent:

UNITED STATES PATENTS

| Number | Name | Date |
|---|---|---|
| 2,419,516 | Bloom | Apr. 22, 1947 |

OTHER REFERENCES

Solmssen, Chem. Rev., vol. 37, 519, 525 and 533 (1945).

Dodds et al., Proc. Roy. Soc. (London), vol. 127B, 140, 141, 144, 154 and 165 (1939).